(12) United States Patent
Lim et al.

(10) Patent No.: US 8,619,422 B2
(45) Date of Patent: Dec. 31, 2013

(54) MOBILE TERMINAL

(75) Inventors: Kyoungtaek Lim, Gyeonggi-Do (KR); Kwanghyun Ahn, Seoul (KR); Hyunho Lee, Gyeonggi-Do (KR); Chanyong Mo, Gyeonggi-Do (KR); Woojin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 13/104,529

(22) Filed: May 10, 2011

(65) Prior Publication Data
US 2011/0292578 A1 Dec. 1, 2011

(30) Foreign Application Priority Data
May 31, 2010 (KR) .................. 10-2010-0051338

(51) Int. Cl.
*G06F 1/16* (2006.01)
*H05K 5/00* (2006.01)
*H05K 7/00* (2006.01)
*H04M 1/00* (2006.01)

(52) U.S. Cl.
USPC .............. 361/679.56; 361/679.3; 455/575.4

(58) Field of Classification Search
USPC ................. 361/679.3, 679.56; 455/575.4
See application file for complete search history.

(56) References Cited

U.S. PATENT DOCUMENTS

| | | | |
|---|---|---|---|
| 7,422,436 B2 * | 9/2008 | Lee ................................... | 439/10 |
| 7,656,662 B2 * | 2/2010 | Chen ......................... | 361/679.55 |
| 7,831,286 B2 * | 11/2010 | Cho et al. .................... | 455/575.4 |
| 7,853,301 B2 * | 12/2010 | Kim et al. .................... | 455/575.4 |
| 7,907,121 B2 * | 3/2011 | Jacobs et al. .................. | 345/168 |
| 2003/0202656 A1 * | 10/2003 | Ikeuchi et al. ................. | 379/419 |
| 2005/0070348 A1 * | 3/2005 | Lee et al. ..................... | 455/575.4 |
| 2006/0046796 A1 * | 3/2006 | Park et al. .................... | 455/575.4 |
| 2007/0080950 A1 * | 4/2007 | Lee et al. ...................... | 345/169 |
| 2007/0105606 A1 * | 5/2007 | Yoon et al. ................... | 455/575.4 |
| 2007/0136405 A1 * | 6/2007 | Weinstein et al. ............. | 708/130 |
| 2007/0142101 A1 * | 6/2007 | Seshagiri et al. ........... | 455/575.4 |
| 2007/0153452 A1 * | 7/2007 | Harmon et al. ............... | 361/679 |
| 2007/0293286 A1 * | 12/2007 | Park et al. .................... | 455/575.1 |
| 2008/0051161 A1 * | 2/2008 | Tashiro ........................ | 455/575.1 |
| 2008/0070650 A1 * | 3/2008 | Kim et al. .................... | 455/575.4 |
| 2008/0167098 A1 * | 7/2008 | Mizuta et al. ............. | 455/575.4 |
| 2008/0186663 A1 * | 8/2008 | Chen ............................ | 361/681 |
| 2009/0036180 A1 * | 2/2009 | Ye ............................... | 455/575.4 |

* cited by examiner

*Primary Examiner* — Adrian S Wilson (74) *Attorney, Agent, or Firm* — Birch, Stewart, Kolasch & Birch, LLP (57) ABSTRACT

Disclosed is a mobile terminal capable of being slid in two directions. The mobile terminal includes a front body, a rear body, and a slide module configured to allow the front body to be slid along a lengthwise direction and widthwise direction with respect to the rear body. The slide module includes a cover plate having an area to cover a whole rear side of the front body; a middle plate having a pair of guide rails on a front side thereof, a slide plate on a rear side thereof, and a first keypad disposed on a region that is not occupied by the pair of guide rails and the slide plate, the pair of guide rails being configured to allow the cover plate to be slid along the lengthwise direction; and a guide plate coupled to the rear body, and configured to allow the slide plate slid along the widthwise direction.

20 Claims, 10 Drawing Sheets

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2010-0051338, filed on May 31, 2010, the contents of which are hereby incorporated by reference herein in its entirety.

BACKGROUND OF THE INVENTION

1. Field of the Invention

The present disclosure relates to a mobile terminal, and particularly, to a slide type mobile terminal.

2. Description of Related Art

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software. For instance, a User Interface (UI) environment is provided in a mobile terminal to enable a user to easily and conveniently search for or select a desired function among available function.

As the mobile terminal is considered as a personal belonging, form factors become diverse for a user's easy selection according to a personality. The mobile terminal includes a typical bar type in which an input/output unit and a display are arranged on one body, a folder or swing type in which one body is open or closed by being rotated with respect to another body, or a slide type in which one body is open or closed by being slidably moved with respect to another body.

Among the various types, the slide type is being spotlighted owing to a simple opening operation, and easy recognition since a display is always exposed to outside of the mobile terminal. The slide type of mobile terminal is mounted with a slide module, a means for connecting a front body to a rear body so as to be slidably moveable. This slide module is required to maintain a mechanical rigidity against repeated sliding operations, and to minimize degradation of the appearance due to parts exposed to the outside when a sliding operation is repeatedly performed.

In order to enhance usability of a numeric keypad in a call mode, and in order to facilitate input of characters, proposed is a form factor of the slide type of mobile terminal. The form factor allows the mobile terminal to be slid not only in one direction, but also in horizontal and vertical directions for utilization of a QWERTY keypad. However, in this case, the mobile terminal may have a thick thickness due to designs emphasized to provide a sufficient rigidity.

BRIEF SUMMARY OF THE INVENTION

Therefore, an object of the present disclosure is to provide a mobile terminal capable of being slid in two directions, and capable of having a minimized thickness by a minimized thickness of a slide module.

To achieve these and other advantages and in accordance with the purpose of the present disclosure, as embodied and broadly described herein, there is provided a mobile terminal including a front body, a rear body, and a slide module configured to allow the front body to be slid along a lengthwise direction and widthwise direction with respect to the rear body, wherein the slide module includes: a cover plate having an area to cover a whole rear side of the front body; a middle plate having a pair of guide rails on a front side thereof, a slide plate on a rear side thereof, and a first keypad disposed on a region that is not occupied by the pair of guide rails and the slide plate, the pair of guide rails being configured to allow the cover plate to be slid along the lengthwise direction; and a guide plate coupled to the rear body, and configured to allow the slide plate slid along the widthwise direction.

The cover plate may include a first surface having a flat surface, and a second surface extending from the first surface in a lengthwise direction and stepped by a preset first depth (d1) with respect to the first surface. The guide rails and the first keypad may be arranged on the first surface.

The cover plate and the slide plate may be formed of a metallic thin plate, and the middle plate may be formed of a resin-based material.

The middle plate may include a mounting recess having a second depth (d2) and configured to mount the first keypad therein, and the first keypad may be accommodated in the mounting recess.

A metallic edge portion may be attached to an upper surface of the mounting recess in a circumferential direction of the mounting recess.

The first keypad may include a top pad having key marks thereon, a switch board attached to a bottom surface of the mounting recess, and a dome sheet disposed between the top pad and the switch board.

The middle plate may further include a plurality of fixing protrusions formed along a circumferential direction of the mounting recess, and the plurality of fixing protrusions may be coupled to the top pad in a melting manner via the metallic edge portion.

The pair of guide rails may be arranged to be separated from each other with a distance therebetween, and the cover plate may include a pair of guide edges formed at both ends thereof in a lengthwise direction so as to be restricted by being fitted into guide recesses disposed on the guide rails.

The front body may further include a housing coupled to the cover plate, and the housing may be formed to cover side edges of the slide module in a widthwise direction.

The middle plate may include an exposure edge portion formed at a lower end of the middle plate, and configured to allow the front body to be partially exposed when the front body is in a closed state.

An undercut configured to accommodate the exposure edge portion therein may be formed at a lower end of the front body.

A slide plate accommodation recess having a third depth (d3) and configured to accommodate the slide plate therein may be formed on a rear surface of the middle plate.

The mounting recess and the slide plate accommodation recess may be implemented as a metallic plate in-molded to the middle plate, respectively.

The second depth (d2) of the mounting recess and the third depth (d3) of the slide plate accommodation recess may be formed not to be greater than the first depth (d1) of the cover plate, respectively.

A guide plate mounting recess configured to mount the guide plate therein may be formed on an upper surface of the rear body.

A display and a speaker may be further provided at the front body, the display may be arranged at a position corresponding to the first surface, and the speaker may be arranged at a position corresponding to the second surface.

A second keypad may be further disposed on a region of an upper surface of the rear body, the region exposed by motion of the front body in a widthwise direction. In this case, the first keypad may be a numeric keypad, and the second keypad may be a QWERTY keypad.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE INVENTION

Description will now be given in detail of the present disclosure, with reference to the accompanying drawings.

For the sake of brief description with reference to the drawings, the same or equivalent components will be provided with the same reference numbers, and description thereof will not be repeated.

Hereinafter, a mobile terminal according to the present disclosure will be explained in more detail with reference to the attached drawings The suffixes attached to components of the mobile terminal, such as 'module' and 'unit or portion' were used for facilitation of the detailed description of the present disclosure. Therefore, the suffixes do not have different meanings from each other.

Figure 1:
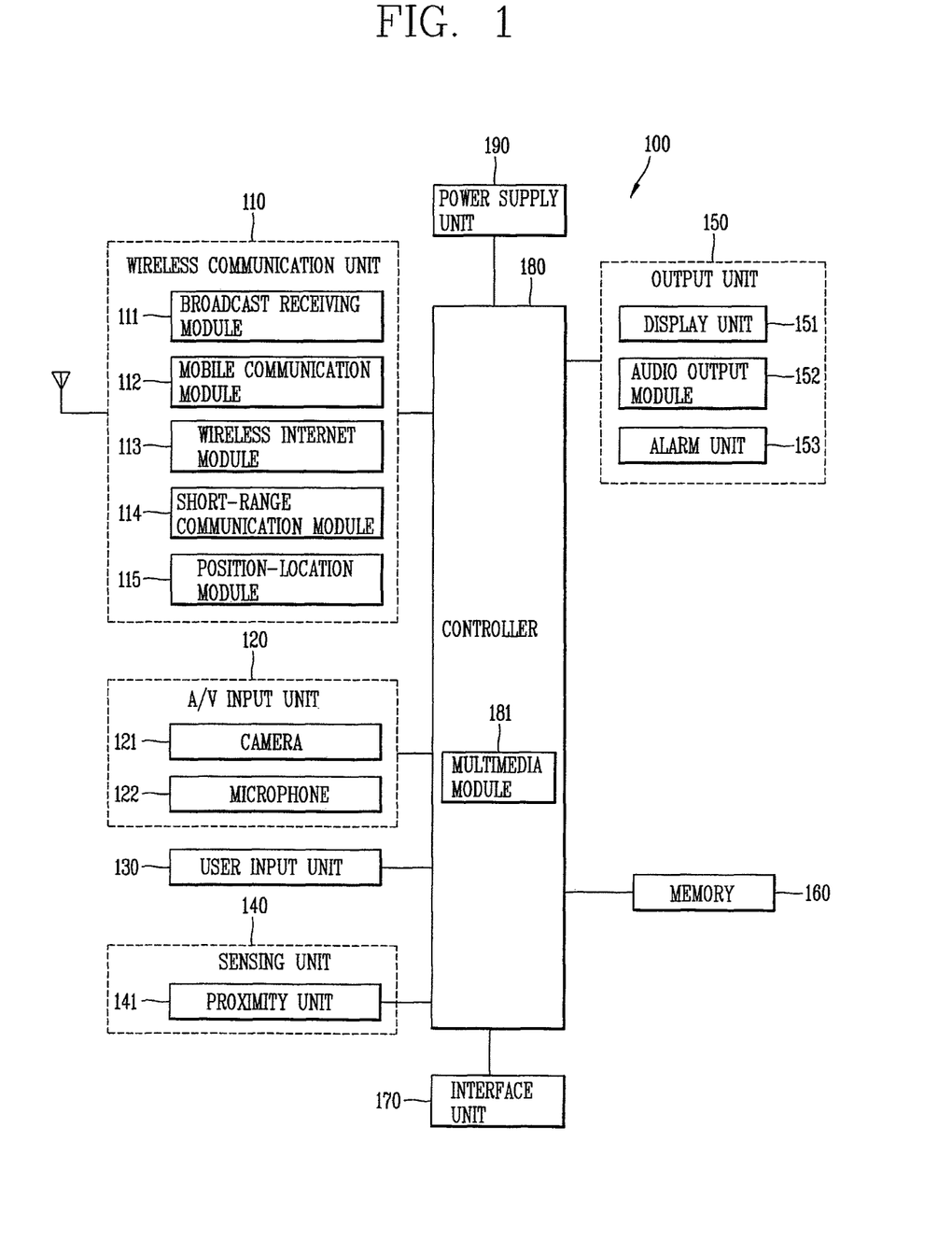
FIG. 1 is a block diagram of a mobile terminal according to the present disclosure.

FIG. 1 is a block diagram of a mobile terminal according to one embodiment of the present disclosure.

The mobile terminal 100 may comprise components, such as a wireless communication unit 110, an Audio/Video (A/V) input unit 120, a user input unit 130, a sensing unit 140, an output module 150, a memory 161, an interface unit 162, a controller 170, a power supply unit 163 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 161.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for detecting or calculating a position of a mobile terminal. An example of the position information module 115 may include a Global Position System (GPS) module. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Also, the GPS module 115 may calculate speed information by continuously calculating a current position real time.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display unit 151.

The image frames processed by the camera 121 may be stored in the memory 161 or transmitted to the exterior via the wireless communication unit 110. Two or more cameras 121 may be provided according to the use environment of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like. When the touch pad has a layered structure with a display unit 151 to be later explained, this may be referred to as a 'touch screen'.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 163, the presence or absence of a coupling or other connection between the interface unit 162 and an external device and the like. Moreover, the sensing unit 140 may include a proximity sensor 141, which will be later explained in relation to a touch screen.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The output unit 150 is configured to output an audio signal, a video signal or an alarm signal. The output unit 150 may include a display unit 151, an audio output module 152, an alarm 153, and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

Here, if the display unit 151 and a touch pad have a layered structure therebetween to constitute a touch screen, the display unit 151 may be used as an input device rather than an output device. The display unit 151 may include at least one of a Liquid Crystal Display (LCD), a Thin Film Transistor-Liquid Crystal Display (TFT-LCD), an Organic Light-Emitting Diode (OLED), a flexible display and a three-dimensional (3D) display.

A proximity sensor 141 may be arranged at an inner region of the mobile terminal covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. Even if the proximity sensor 141 has not been mounted, when the touch screen is a capacitance type, approaching of a pointer may be detected according to changes of an electric field.

The audio output module 152 may output audio data received from the wireless communication unit 110 or stored in the memory 161, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. For instance, the alarm 153 may be configured to vibrate responsive to the mobile terminal receiving a call or message. As another example, when a key signal has been inputted, the alarm 153 may output vibration as a feedback of the key signal input. Through this vibration output, a user may recognize the occurrence of an event. In order to output a signal in a vibration manner, the mobile terminal may be mounted with a vibrator. Here, the video signal or audio signal may be outputted through the display unit 151 or the audio output module 152.

The memory 160 may temporarily store programs for controlling and processing by the controller 180, and may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Figure 2:
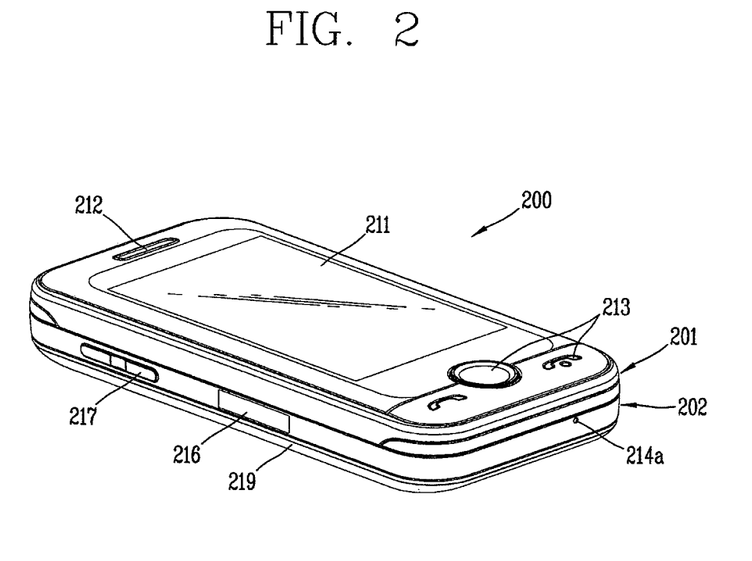
FIG. 2 is a front perspective view showing a closed state of a mobile terminal according to the present disclosure.
Figure 3:
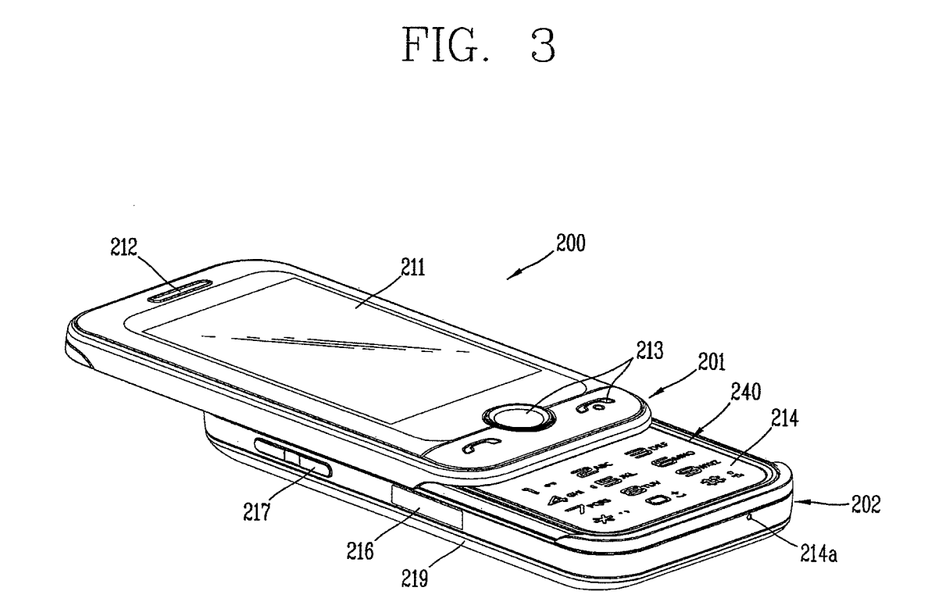
FIG. 3 is a front perspective view showing a first open state of the mobile terminal of FIG. 2.
Figure 4:
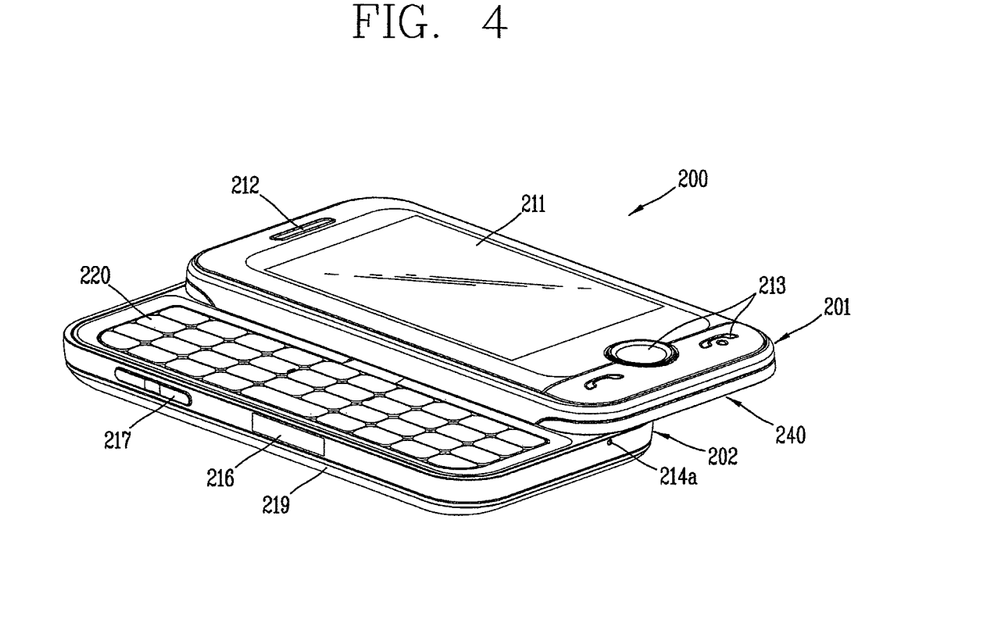
FIG. 4 is a front perspective view showing a second open state of the mobile terminal of FIG. 2.

FIG. 2 is a front perspective view showing a closed state of a mobile terminal according to the present disclosure, FIG. 3 is a front perspective view showing a first open state of the mobile terminal of FIG. 2, and FIG. 4 is a front perspective view showing a second open state of the mobile terminal of FIG. 2.

As shown, a mobile terminal 200 includes a front body 201 and a rear body 202 coupled to each other so as to be moveable with respect to each other.

As shown in FIG. 2, the front body 201 is arranged to overlap the rear body 202. A state that the front body 201 completely overlaps the rear body 202 is referred to as a 'closed state'. As shown in FIG. 3, a state that a specific part of the slide module 240 is exposed to the outside as the front body 201 moves in a lengthwise direction with respect to the rear body 202 is referred to as a 'first open state'. As shown in FIG. 4, a state that a specific part of the rear body 202 is exposed to the outside as the front body 201 moves in a widthwise direction with respect to the rear body 202 is referred to as a 'second open state'.

A display 211 is mounted to a front surface of the front body 201, and a key manipulation portion 213 for input is arranged below the display 211. A speaker or a receiver 212 for voice output is formed above the display 211.

The display 211 may be configured to be protected by a window which covers an entire surface of the front body 201. A touch sensing means may be provided on the window so that the display 211 and the key manipulation portion 213 can be manipulated by touch. Here, the key manipulation portion 213 may be implemented as general push buttons.

A battery 219 for supplying power to the mobile terminal 200 is mounted to a rear surface of the rear body 202. The battery 219 may be implemented as a package type in which a cell and a cover are integrally formed with each other, or a separated type in which a cover is separated from a cell.

An interface unit 216 is formed on a side surface of the rear body 202. The interface unit 216 serves as a passage through which the mobile terminal of the present disclosure exchanges data with an external device. For instance, the interface unit 216 may be implemented as one of a connection terminal for connection to an ear phone by wire or by radio, a port for a short-range communication (e.g., IrDA port, Bluetooth port, wireless LAN port, etc.), or a power supply terminal for supplying power to the mobile terminal. Furthermore, the interface unit 216 may be configured as a card socket for accommodating an external card, e.g., a memory card for storing information, a User Identity Module (UIM), a Subscriber Identity Module (SIM), and the like.

A side key 217 may be disposed on a side surface of the rear body 202. The side key 217, the key manipulation portion 213, a first keypad 214 and a second keypad 220 to be later explained may be referred to as a 'manipulating portion'. Any type of side key 217 may be used only if it is manipulated by a user's tactile manner. For instance, the manipulating portion may be implemented as a dome switch, a touch screen a touch pad for receiving commands or information by a user's push or touch, or may be implemented as a jog wheel, a jog switch and the like.

A microphone 215 configured to input voice or sound is mounted on a side surface of a lower end of the rear body 202.

Figure 5:
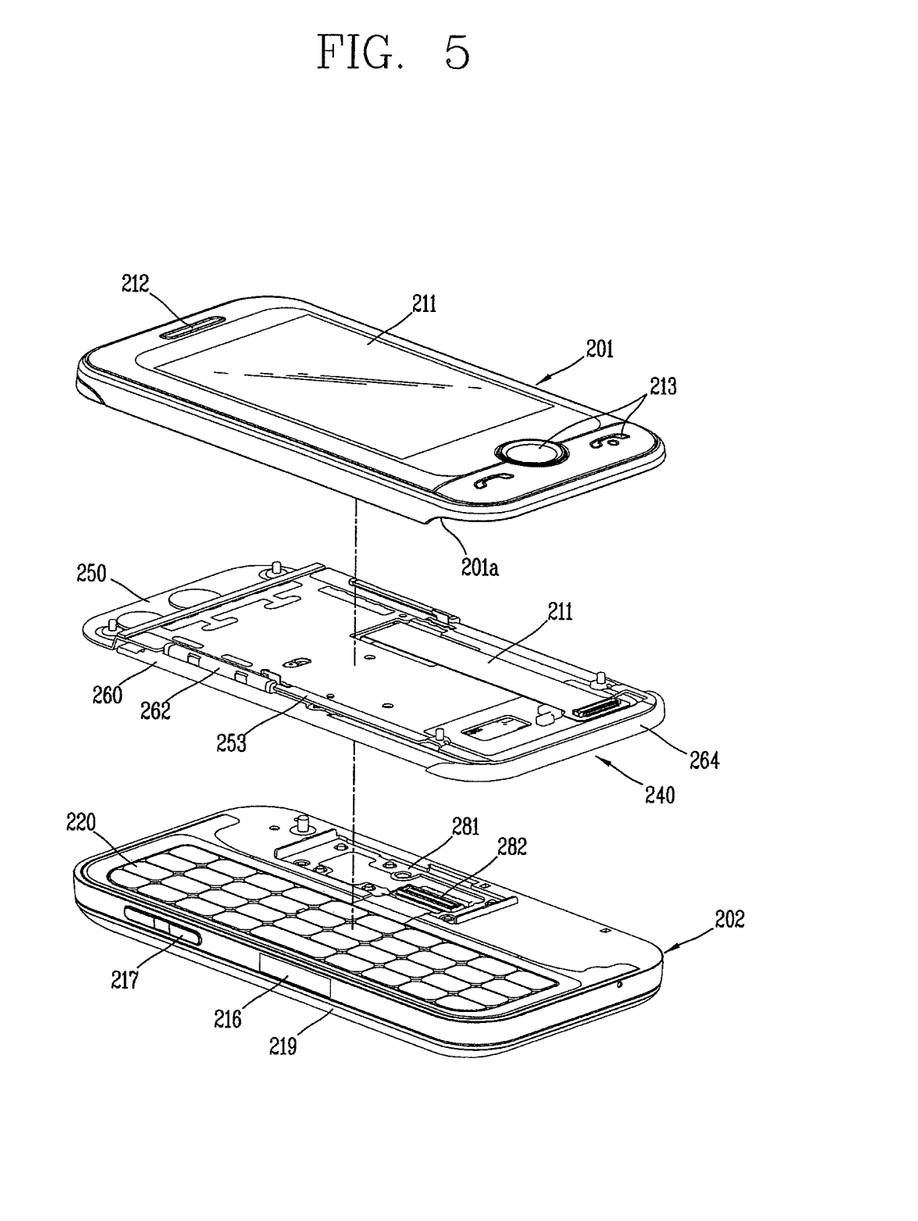
FIG. 5 is an exploded front perspective view showing a disassembled state of the mobile terminal of FIG. 2 into a front body, a rear body, and a slide module.
Figure 6:
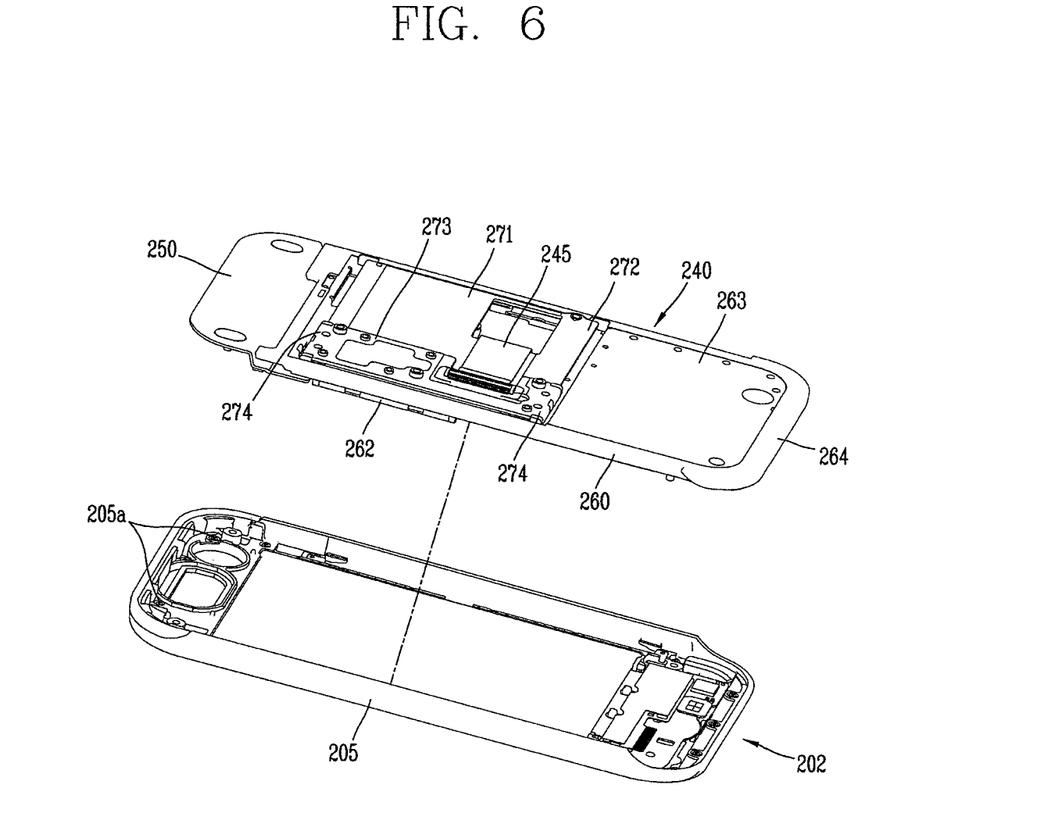
FIG. 6 is an exploded rear perspective view showing a relation between a slide module and a front body.

The slide module 240 configured to slidably connect the front body 201 to the rear body 202 in a lengthwise direction and a widthwise direction is provided between the front body 201 and the rear body 202. Most parts of the slide module 240, except for an exposure edge portion of the slide module 240, are not viewed by being covered by the front body 201 and the rear body 202 as shown in FIG. 2, especially, a housing 205 of the front body 201. When the front body 201 is in a first open state by being slid in a lengthwise direction, the first keypad 214 of the slide module 240 is exposed to the outside. On the other hand, when the front body 201 is in a second open state by being slid in a widthwise direction, or when the front body 201 is returned to the closed state of FIG. 2 from the second open state, most parts of the slide module 240 except for an exposure edge portion are covered. As shown in FIGS. 5 and 6, an undercut 205a is formed at a lower end of the housing 205 so as to accommodate the exposure edge portion 264 therein.

In the first open state, the first keypad 214 is exposed to the outside as shown in FIG. 3. The first keypad 214 includes a plurality of keys having key marks thereon. In the second open state, a front surface of the rear body 202 is partially exposed to the outside as shown in FIG. 4. Here, the second keypad 220 is arranged on the exposed part of the front surface of the rear body 202. Preferably, the first keypad 214 may be a numeric keypad, which may be effectively used when the mobile terminal 200 is in a dial mode or a calculation mode. On the other hand, the second keypad 220 may be a QWERTY keypad, which may be effectively used when the mobile terminal 200 is in an editor mode or a text message writing mode, etc.

Figure 7:
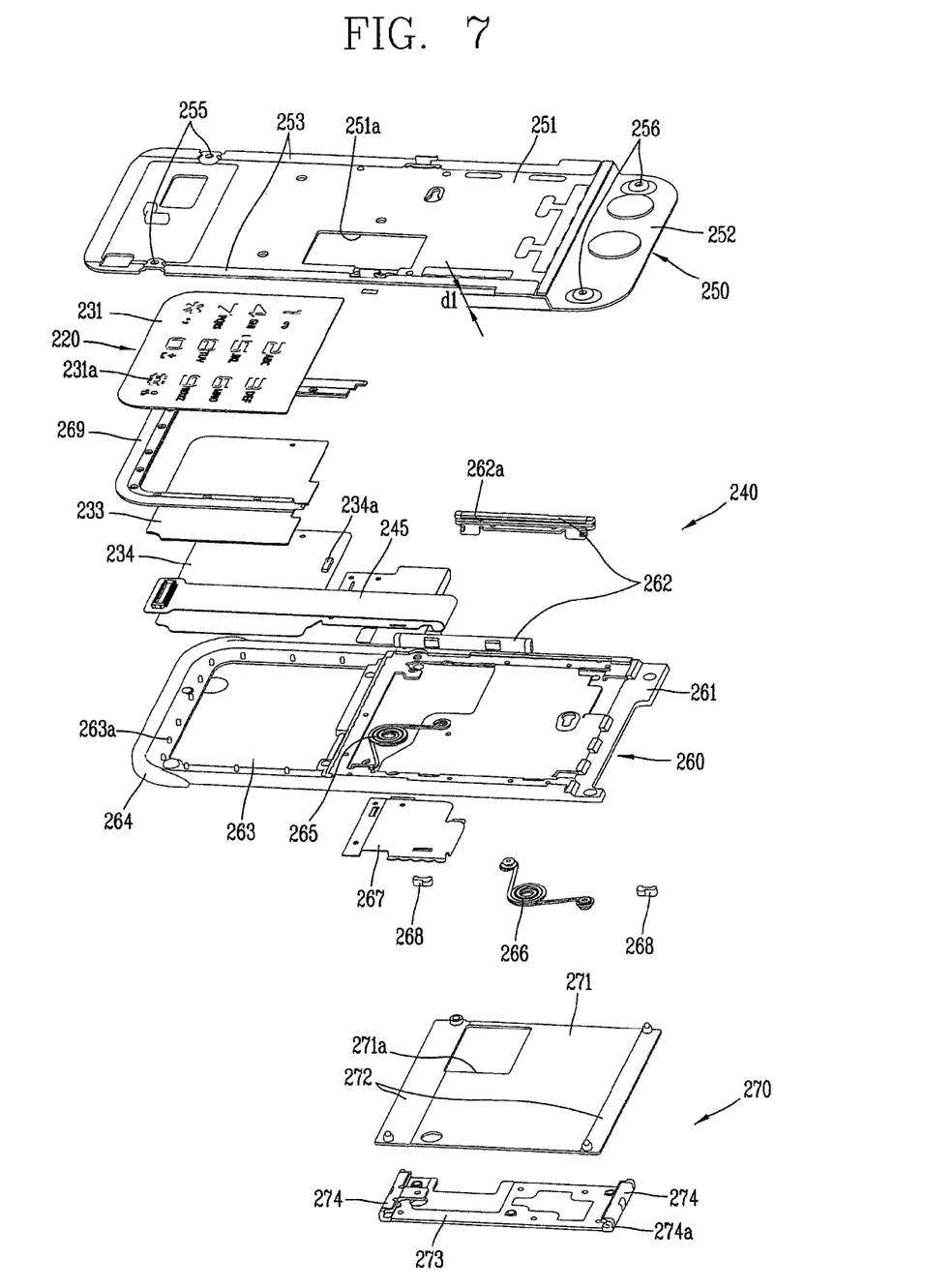
FIG. 7 is an exploded front perspective view of a slide module according to the present disclosure.

FIG. 5 is an exploded front perspective view showing a disassembled state of the mobile terminal of FIG. 2 into a front body, a rear body, and a slide module, FIG. 6 is an exploded rear perspective view showing a relation between a slide module and a front body, and FIG. 7 is an exploded front perspective view of a slide module according to the present disclosure.

As shown, the slide module 240 is provided between the front body 201 and the rear body 202. The slide module 240 includes complicated mechanical components configured to allow the mobile terminal to be repeatedly slid, stopped or provided with an elastic force.

Functionally, the slide module 240 may be divided into a part for guiding a sliding motion of the front body 201 in a lengthwise direction, and a part for guiding a sliding motion of the front body 201 in a widthwise direction. A cover plate 250 and guide rails 262 are provided for the former case (sliding motion in a lengthwise direction), whereas a slide plate 271 and a guide plate 273 are provided for the latter case (sliding motion in a widthwise direction).

These components for a sliding motion of the mobile terminal are properly arranged for a slim structure of the slide module 240. For instance, as shown in FIG. 7, the guide rails 262 and the slide plate 271 are supportedly-fixed to a middle plate 260. The middle plate 260 not only provides a function relating to a sliding motion, but also supports the first keypad 214. More concretely, the middle plate 260 provides a proper strength to the first keypad 214 so that pressures repeatedly applied to the first keypad 214 can be maintained.

In order to reduce the amount of materials and to implement a slim configuration, the cover plate 250 is formed to cover a rear surface of the front body 201. More concretely, as shown in FIG. 6, a rear surface of the cover plate 250 is directly coupled to the front body 201 which is in an open state before an assembly process. Accordingly, as shown in FIGS. 6 and 7, the cover plate 250 includes screw holes 255 and 256 for coupling with screw holes 206 formed at an inner side of the front body 201.

The cover plate 250 includes first guide edges 253 at both ends thereof for a sliding motion in a lengthwise direction. The first guide edges 253 are configured to be slid in a fitted state into recesses 262a of the guide rails 262. Accordingly, the cover plate 250 serves as the housing of the front body 201, and is used for a sliding motion of the mobile terminal. The cover plate 250 may be implemented as a metallic thin plate formed of stainless steel or aluminum.

Referring to FIG. 7, in the aspect of shapes, the cover plate includes a first surface 251, and a second surface 252 extending from the first surface 251 in a lengthwise direction and stepped by a preset first depth (d1) with respect to the first surface 251. As a result, the front body 201 covered by the first surface 251 has a thickness a little thinner than that of the front body 201 covered by the second surface 252. This may be related to the display 211 and the speaker 212. The display 211 may be formed to have a thin thickness, whereas the speaker 212 may be formed to have a thick thickness. Accordingly, the display 211 may be disposed at a position corresponding to the first surface 251, and the speaker 212 may be disposed at a position corresponding to the second surface 252. A damping member 259 for stable mounting of the speaker 212 may be attached to the second surface 252.

Components relating to a sliding motion (e.g., guide rails 262, first spring 265, etc.) and the first keypad 214 may be arranged at a space formed by a thickness (d1) between the first surface 251 and the second surface 252. This may minimize a thickness of the slide module 240.

The guide rails 262 fixed to the middle plate 260 are formed in one pair, and are separated from each other such that a thickness of the middle plate 260 is not increased. The guide rails 262 are positioned at a space formed by the thickness (d1) between the first surface 251 and the second surface 252 in a mounted state to the middle plate 260. The first spring 265 configured to provide an elastic force to the cover plate 250 when the cover plate 250 performs a sliding motion with respect to the middle plate 260 is also positioned at a space formed by the thickness (d1) between the first surface 251 and the second surface 252.

Referring to FIG. 7, a mounting recess 263 having a second depth (d2) and configured to mount the first keypad 214 therein is formed at the middle plate 260. More concretely, the first keypad 214 is accommodated in the mounting recess 263, and thus the first keypad 214 overlaps the guide rails 262 for a sliding motion in a lengthwise direction. This may prevent the mobile terminal from having a thick thickness. The first keypad 214 includes a top pad 231 having key marks 231a thereon, a switch board 234 attached to a bottom surface of the mounting recess 263, and a dome sheet 233 disposed between the top pad 231 and the switch board 234. The top pad 231 may include a transparent region for viewing of the key marks 231a and an opaque region, and may be formed by printing, etching, etc. The switch board 234 includes a pattern of a plurality of conductive contacts, and may be implemented as a flexible PCB. The dome sheet 233 may be formed to have a plurality of domes attached thereto. A light emitting means such as a diode 234a for backlighting may be provided at the switch board 234. The dome sheet 233 may further include a light guide plate for less power and uniform light emitting. A metallic edge portion 269 is attached to an upper surface of the mounting recess 263 along a circumferential direction of the mounting recess 263. This metallic edge portion 269 reinforces an intensity of the middle plate 260 at the mounting recess 263. The middle plate 260 is provided with a plurality of fixing protrusions 263a along a circumferential direction of the mounting recess 263. These fixing protrusions 263a are coupled to the top pad 231 in a melting manner, via a through hole 269a formed at the metallic edge portion 269.

The slide plate 271 for a sliding motion of the front body 201 is fixed to a rear surface of the middle plate 260. The slide plate 271 is provided with a pair of second guide edges 272 formed in a widthwise direction. The second guide edges 272 are configured to slidably move in a widthwise direction by being fitted into recesses 274a of the guide rails 274 of the guide plate 273 fixed to the rear body 202. A second spring 266 configured to provide an elastic force to the guide plate 273 when the guide plate 273 moves is disposed between the slide plate 271 and the guide plate 273.

Each of the slide plate 271 and the guide plate 273 may be formed by processing a metallic thin plate. A moving plate mounting recess 281 configured to accommodate the guide plate 273 therein may be formed on a front surface of the rear body 202.

Figure 12:
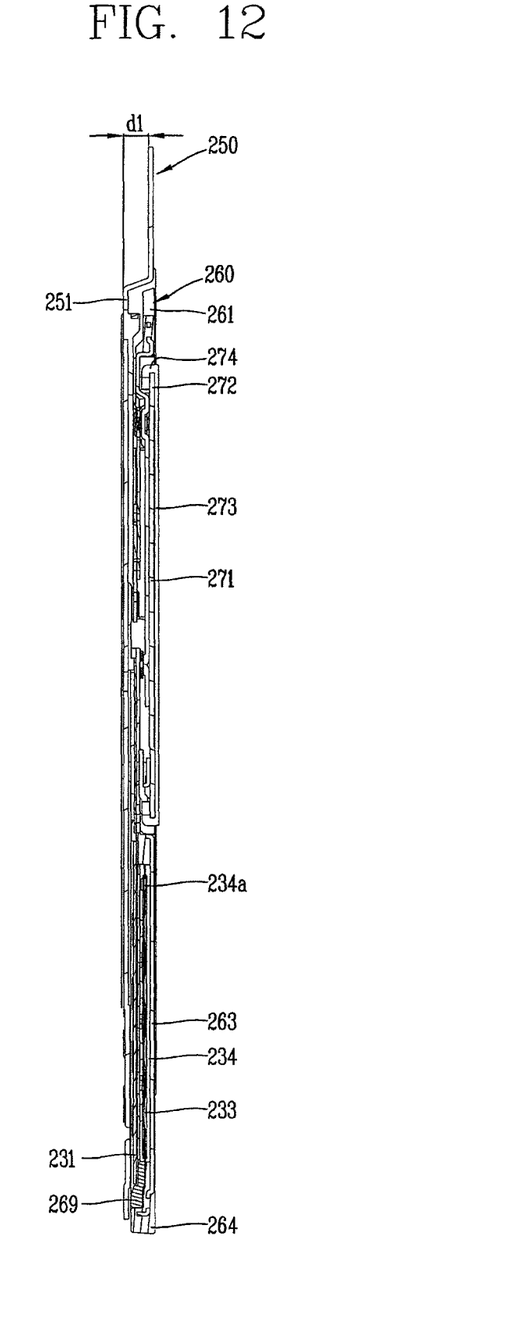
FIG. 12 is a longitudinal sectional view of a slide module according to the present disclosure.

As shown in FIG. 12, a slide plate accommodation recess 277 having a third depth (d3) is formed to accommodate the slide plate 271 and the second spring 266 therein. In order to compensate for intensity weakness due to a thin thickness, the mounting recess 263 of the first keypad 214 and the slide plate accommodation groove 277 may be implemented as a metallic plate in-molded to the middle plate 260, respectively.

The slide plate accommodation recess 277 and the slide plate 271 are disposed at a position corresponding to the first surface 251 of the cover plate 250 without overlapping the first keypad 214.

In order to electrically connect the front body 201 and the rear body 202 to each other when the front body 201 moves in a widthwise direction or a lengthwise direction, a connection means 245 is provided at the cover plate 250, the middle plate 260, the slide plate 271, etc. The connection means 245 may be implemented as a flexible PCB, etc. As shown in FIG. 7, the connection means 245 may be integrally formed with the switch board 234.

Figure 8:
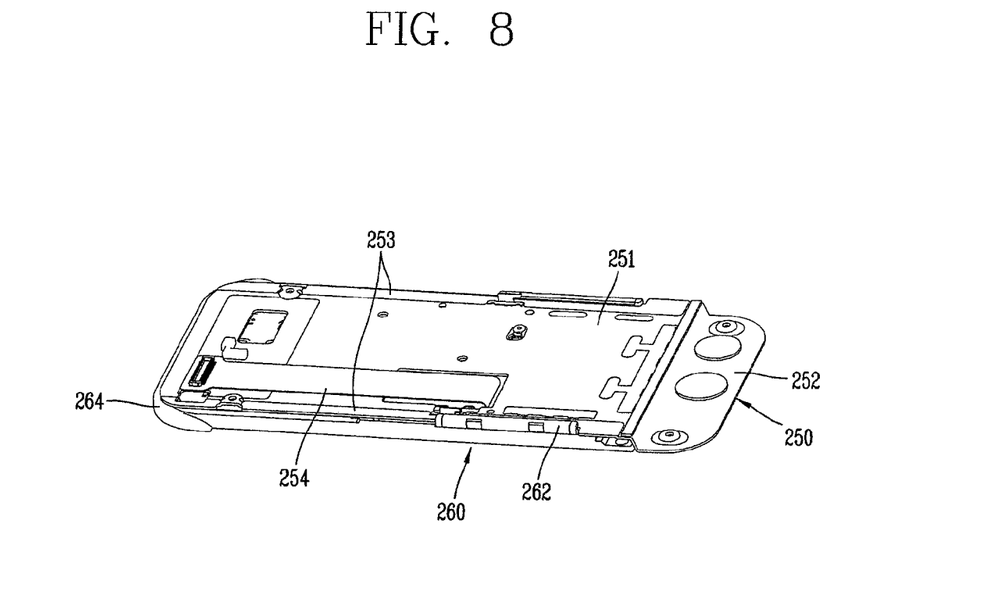
FIG. 8 is a front perspective view of a slide module in a closed state.
Figure 9:
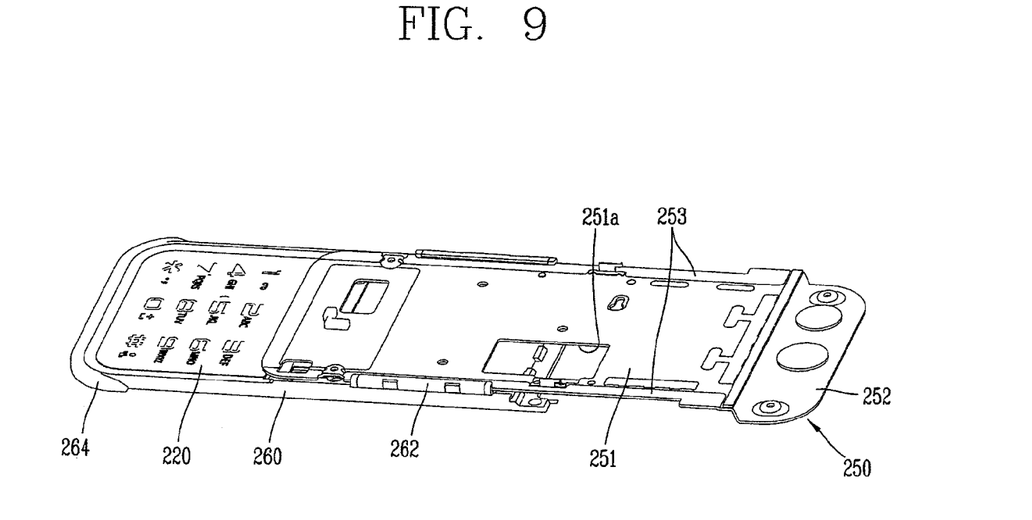
FIG. 9 is a front perspective view of a slide module in a first open state.
Figure 10:
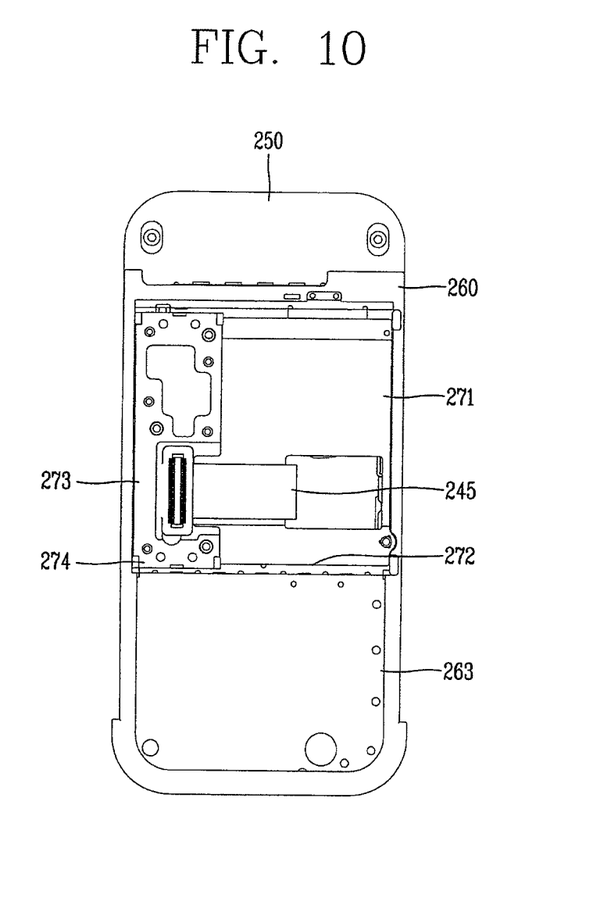
FIG. 10 is a rear perspective view of a slide module in a closed state.
Figure 11:
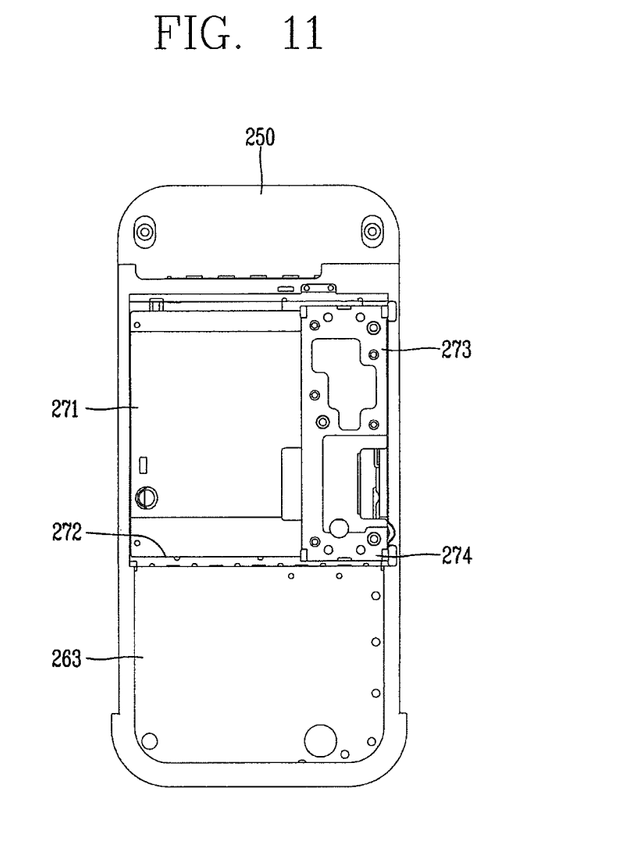
FIG. 11 is a rear perspective view of a slide module in a second open state.

FIGS. 8 to 11 show motions of the slide module 240 in a lengthwise direction and a widthwise direction. More concretely, FIG. 8 is a front perspective view of the slide module in a closed state, FIG. 9 is a front perspective view of the slide module in a first open state, FIG. 10 is a rear perspective view of the slide module in a closed state, and FIG. 11 is a rear perspective view of the slide module in a second open state.

As shown in FIG. 9, the first keypad 214 is exposed to the outside in a first open state, and the first surface 251 and the second surface 252 of the cover plate 250 are partially exposed to the outside at the opposite side. The cover plate 250 may prevent degradation of the appearance in the first open state owing to a simple surface thereof. As shown in FIG. 11, in a second open state, the first surface 251 of the cover plate 250, a part of the slide plate 271, and a part of a rear surface of the mounting recess 263 of the first keypad 214 are exposed. These surfaces may be also formed to have simple appearances, thereby enhancing the entire appearance.

FIG. 12 is a longitudinal sectional view of the slide module according to the present disclosure. As shown in FIG. 12, the second depth (d2) of the mounting recess 263 of the first keypad 214, and the third depth (d3) of the slide plate accommodation recess 277 are formed not to be greater than the first depth (d1) of the cover plate 250, respectively. That is, the first keypad 214, the middle plate 260, the slide plate 271, etc. are arranged within the first depth (d1) of the cover plate 250, thereby implementing the slide module 240 having a thinner thickness.

According to the mobile terminal of the present disclosure, the cover plate, a means for moving the mobile terminal in a lengthwise direction is configured to cover a rear surface of the front body. This may allow two functions to be performed by one material. That is, the amount of materials to be used is reduced. Furthermore, since the first keypad is disposed on a position not overlapping components for sliding motion in a widthwise direction, the mobile terminal may have a minimized thickness.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile terminal comprising:
    a front body;
    a rear body; and
    a slide module configured to allow the front body to slide along a lengthwise direction and a widthwise direction with respect to the rear body, the slide module including:
        a cover plate covering a rear side of the front body;
        a middle plate having a pair of guide rails on a front side thereof, the pair of guide rails being configured to allow the cover plate to slide along the lengthwise direction;
        a slide plate located on a rear side of the middle plate;
        a first keypad disposed on a region of the middle plate that is not occupied by the pair of guide rails and the slide plate; and
        a guide plate coupled to the rear body, the guide plate being configured to allow the slide plate to slide along the widthwise direction.

2. The mobile terminal of claim 1, wherein the cover plate includes:
    a first surface having a flat surface; and
    a second surface extending from the first surface in the lengthwise direction, the second surface being stepped by a first depth (d1) with respect to the first surface,
    wherein the guide rails and the first keypad are arranged on the first surface.

3. The mobile terminal of claim 1, wherein the cover plate and the slide plate are formed of a metallic thin plate and the middle plate is formed of a resin-based material.

4. The mobile terminal of claim 3, wherein the middle plate includes a mounting recess at the front side, the mounting recess extending a second depth (d2) from a front surface of the front side, and the first keypad is located in the mounting recess.

5. The mobile terminal of claim 4, further comprising a metallic edge portion attached to an upper surface of the mounting recess, the edge portion extending around a portion of the perimeter of the mounting recess.

6. The mobile terminal of claim 5, wherein the first keypad includes:
    a top pad having key marks thereon;
    a switch board attached to a bottom surface of the mounting recess; and a dome sheet disposed between the top pad and the switch board.

7. The mobile terminal of claim 6, wherein the middle plate further includes a plurality of fixing protrusions formed along a portion of the mounting recess, the plurality of fixing protrusions being coupled to the top pad via the metallic edge portion.

8. The mobile terminal of claim 4, wherein the middle plate includes a slide plate accommodation recess at the rear side, the slide plate accommodation recess extending a third depth (d3) from a rear surface of the rear side, and the slide plate is located therein.

9. The mobile terminal of claim 8, wherein each of the mounting recess and the slide plate accommodation recess is provided as a metallic plate in-molded to the middle plate.

10. The mobile terminal of claim 8, wherein the cover plate includes:
a first surface having a flat surface; and
a second surface extending from the first surface in the lengthwise direction, the second surface being stepped by a first depth (d1) with respect to the first surface,
wherein each of the second depth (d2) of the mounting recess and the third depth (d3) of the slide plate accommodation recess are not greater than the first depth (d1) of the cover plate.

11. The mobile terminal of claim 8, wherein a guide plate mounting recess configured to mount the guide plate therein is located on a front surface of the rear body.

12. The mobile terminal of claim 1, wherein the pair of guide rails are separated from each other with a distance therebetween, each guide rail having a guide recess, and
wherein the cover plate includes a pair of guide edges formed at opposite ends thereof, the guide edges extending in a lengthwise direction and fitted into corresponding guide recesses of the guide rails.

13. The mobile terminal of claim 1, wherein the front body includes a housing coupled to the cover plate, the housing being formed to cover side edges of the slide module extending in the widthwise direction.

14. The mobile terminal of claim 13, wherein the middle plate includes an exposure edge portion formed at a lower end thereof, the exposure edge portion being configured to allow the front body to be partially exposed in a closed state.

15. The mobile terminal of claim 14, wherein the front body includes an undercut formed at a lower end of the front body, the undercut being configured to accommodate the exposure edge portion therein.

16. The mobile terminal of claim 1, wherein the front body includes a display and a speaker, the display being arranged at a position corresponding to the first surface of the cover plate, and the speaker being arranged at a position corresponding to the second surface of the cover plate.

17. The mobile terminal of claim 1, wherein the rear body includes a second keypad arranged on a region of an upper surface thereof, the region being exposed by motion of the front body in the widthwise direction.

18. The mobile terminal of claim 17, wherein the first keypad is a numeric keypad and the second keypad is a QWERTY keypad.

19. A slide module for a mobile terminal having a front body and a rear body, the slide module comprising:
a cover plate configured to cover a rear side of the front body of the mobile terminal;
a middle plate having a pair of guide rails on a front side thereof, the pair of guide rails being configured to allow the cover plate to slide along a lengthwise direction of the middle plate;
a slide plate located on a rear side of the middle plate;
a numeric keypad disposed on a region of the middle plate that is not occupied by the pair of guide rails and the slide plate; and
a guide plate configured to be coupled to the rear body of the mobile terminal, the guide plate being configured to allow the slide plate to slide along the widthwise direction of the middle plate.

20. The slide module of claim 19, wherein the cover plate and the slide plate are formed of a metallic thin plate and the middle plate is formed of a resin-based material.

* * * * *